United States Patent
Sonobe

(10) Patent No.: US 8,354,493 B2
(45) Date of Patent: Jan. 15, 2013

(54) POLYAMIC ACID COMPOSITION, POLYIMIDE ENDLESS BELT, BELT SUPPORTING MEMBER, FIXING MEMBER AND IMAGE FORMATION DEVICE

(75) Inventor: Kenya Sonobe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 509 days.

(21) Appl. No.: 12/556,196

(22) Filed: Sep. 9, 2009

(65) Prior Publication Data

US 2010/0233488 A1 Sep. 16, 2010

(30) Foreign Application Priority Data

Mar. 13, 2009 (JP) .................. 2009-061346

(51) Int. Cl.
*C08G 69/26* (2006.01)
*C08L 79/08* (2006.01)

(52) U.S. Cl. ........ 528/353; 525/436; 528/332; 528/335; 528/342; 528/347; 528/348

(58) Field of Classification Search ............. 528/332, 528/335, 342, 347, 348, 353; 525/436
See application file for complete search history.

(56) References Cited

U.S. PATENT DOCUMENTS

| | | | |
|---|---|---|---|
| 4,394,340 A | 7/1983 | Tarumi et al. | |
| 5,268,446 A | 12/1993 | Tamai et al. | |
| 5,286,840 A * | 2/1994 | Oikawa et al. | ............ 528/353 |
| 5,621,512 A | 4/1997 | Uehara et al. | |
| 2010/0038606 A1 | 2/2010 | Inoue et al. | |

FOREIGN PATENT DOCUMENTS

| | | |
|---|---|---|
| EP | 2 058 347 A1 | 5/2009 |
| JP | A-57-74131 | 5/1982 |
| JP | A-61-273919 | 12/1986 |
| JP | A-62-19437 | 1/1987 |
| JP | A-5-170905 | 7/1993 |
| JP | A-7-198929 | 8/1995 |
| JP | A-8-262903 | 10/1996 |
| JP | A-9-272739 | 10/1997 |
| JP | A-2000-63518 | 2/2000 |
| JP | A-2005-215028 | 8/2005 |
| JP | A-2006-16592 | 1/2006 |
| JP | A-2006-255615 | 9/2006 |
| JP | A-2008-95006 | 4/2008 |
| JP | A-2008-106095 | 5/2008 |
| WO | WO 2008/123097 A1 | 10/2008 |

OTHER PUBLICATIONS

Notice of Reasons for Rejection for priority Japanese Patent Application No. 2009-061346, mailed on Jan. 5, 2011 (w/ English translation).

* cited by examiner

*Primary Examiner* — Ana Woodward
(74) *Attorney, Agent, or Firm* — Oliff & Berridge, PLC

(57) ABSTRACT

A polyamic acid composition including a polyamic acid, the polyamic acid having an imidization ratio of from about 5.0% to about 25.0%, and being obtained by reacting a diamine compound, a tetracarboxylic dianhydride and an acid monoanhydride at an amount ratio that satisfies the following formula (1): $0.970 < Y/X < 0.998$ and Formula (2): $0.00 < Z/2(X-Y) < 0.50$. In Formula (1) and Formula (2), X represents a content (mol) of the diamine compound, Y represents a content (mol) of the tetracarboxylic dianhydride, and Z represents a content of the acid monoanhydride (mol).

4 Claims, 2 Drawing Sheets

POLYAMIC ACID COMPOSITION, POLYIMIDE ENDLESS BELT, BELT SUPPORTING MEMBER, FIXING MEMBER AND IMAGE FORMATION DEVICE

CROSS-REFERENCE TO RELATED APPLICATION

This application is based on and claims priority under 35 USC 119 from Japanese Patent Application No. 2009-61346 filed Mar. 13, 2009.

TECHNICAL FIELD

The invention relates to a polyamic acid composition, a polyimide endless belt, a belt supporting member, a fixing member and an image formation device.

RELATED ART

In an image formation device employing an electrophotographic system, a rotatable member formed from metal, plastics or rubber is used as a fixing member that fixes a toner image on a recording medium by applying heat or pressure. This rotatable member is preferably deformable in order to reduce the size of image formation device and improve the performances thereof. A belt formed from a thin plastic film may be used as the rotatable member. In this case, a seamless belt having no ends is used as the belt.

Polyimide is a suitable material for the aforementioned endless belt.

SUMMARY

According to an aspect of the invention, there is provided a polyamic acid composition including a polyamic acid, the polyamic acid having an imidization ratio of from about 5.0% to about 25.0%, and being obtained by reacting a diamine compound, a tetracarboxylic dianhydride and an acid monoanhydride at an amount ratio that satisfies the following Formula (1) and Formula (2):

$$0.970 < Y/X < 0.998 \qquad \text{Formula (1)}$$

$$0.00 < Z/2(X-Y) < 0.50 \qquad \text{Formula (2)}$$

wherein in Formula (1) and Formula (2), X represents a content (mol) of the diamine compound, Y represents a content (mol) of the tetracarboxylic dianhydride, and Z represents a content of the acid monoanhydride (mol).

BRIEF DESCRIPTION OF THE DRAWINGS

Exemplary embodiments of the present invention will be described in detail based on the following figures, wherein.

DETAILED DESCRIPTION

<First Exemplary Embodiment: Polyamic Acid Composition>

Figure 1:
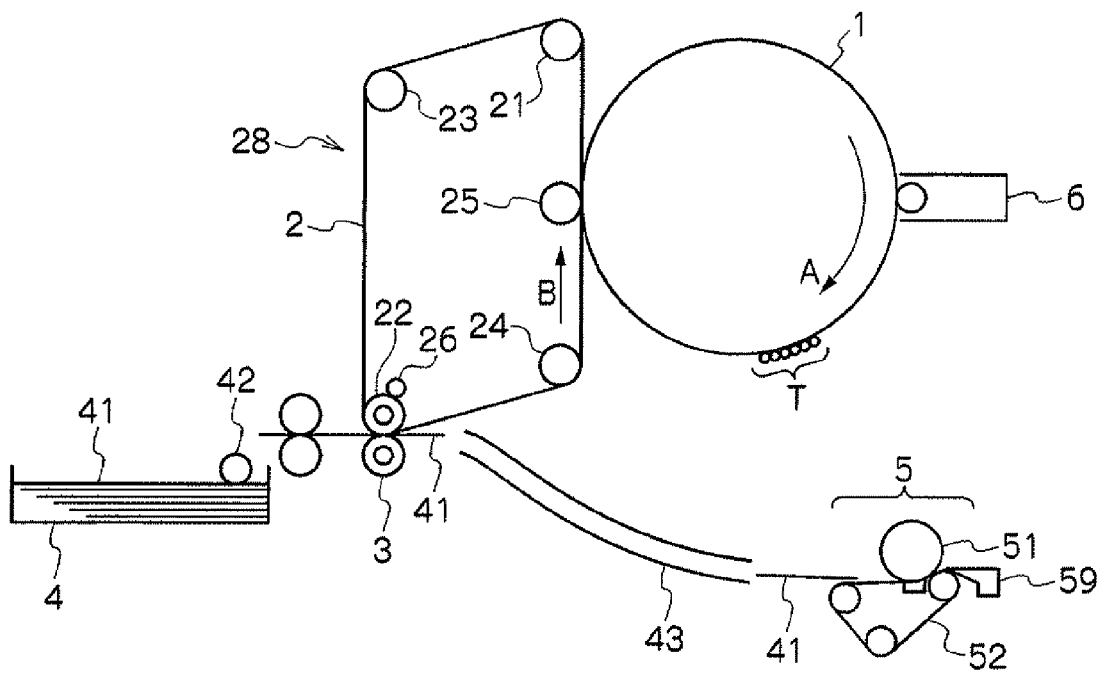
FIG. 1 is a schematic view of an image formation device according to a third exemplary embodiment of the invention that employs an intermediate transfer belt and a polyimide endless belt as a fixing belt.

The polyamic acid composition according to a first exemplary embodiment includes a polyamic acid, the polyamic acid having an imidization ratio of from about 5.0% to about 25.0%, and being obtained by reacting a diamine compound, a tetracarboxylic dianhydride and an acid monoanhydride at an amount ratio that satisfies the following Formula (1) and Formula (2):

$$0.970 < Y/X < 0.998 \qquad \text{Formula (1)}$$

$$0.00 < Z/2(X-Y) < 0.50 \qquad \text{Formula (2)}$$

wherein in Formula (1) and Formula (2), X represents a content (mol) of the diamine compound, Y represents a content (mol) of the tetracarboxylic dianhydride, and Z represents a content of the acid monoanhydride (mol).

-Polyamic Acid Obtained by Reaction at an Amount Ratio that Satisfies Formulae (1) and (2)-

A so-called terminal-blocking technique has been conventionally applied to a process of obtaining a polyamic acid. In this technique, an acid monoanhydride is added to a polyamic acid obtained by adding a tetracarboxylic dianhydride to an excess amount of diamine compound, and then polymerizing the same. This terminal-blocking technique has an effect of improving chemical/thermal stability of the obtained polyamic acid by deactivating the amino group positioned at a terminal end of the polyamic acid. In order to achieve this effect, addition of excessive amount of acid monoanhydride with respect to the amount of the amino groups at the terminal ends of the polyamic acid has been conventionally conducted.

On the other hand, according to this exemplary embodiment, the acid monoanhydride is added to the polyamic acid at an amount within a range that satisfies the above Formulae (1) and (2). Namely, the amount of acid monoanhydride to be added to the polyamic acid obtained from the diamine compound and tetracarboxylic dianhydride is less than that of the conventional technique. Accordingly, in addition to improvements in chemical/thermal stability of the polyamic acid, improvements in mechanical strength, especially folding endurance, of a polyimide obtained by imidizing the polyamic acid may be achieved.

The reason for the above effects is not exactly clear, but it is presumed as described below.

A polyamic acid is converted to a polyimide through a heating/sintering process. In the heating/sintering process, it is known that the polymerization degree of the polyamic acid decreases due to its depolymerization reaction that occurs due to the increase of the temperature and splashing of a solvent. When the sintering is performed at even higher temperature, the solvent evaporates and the polymerization degree of polyamic acid increases again, thereby forming a polyimide through a subsequent dehydration reaction. It is presumed that when most of the terminal ends of the polyamic acid are blocked by the acid monoanhydride, polymerization degree does not increase again after the depolymeization reaction, thereby forming a polyimide having an insufficient mechanical strength.

On the other hand, when the polyamic acid satisfies the relationship of Z/2(X−Y)<0.50 as specified in the above Formula (2), it is presumed that the terminal structure of the polyamic acid exhibits a high degree of interaction and the polymerization degree increases after the depolymerization during the heating/sintering process, thereby enabling the formation of a polyimide having an improved mechanical strength, especially folding endurance.

When the polyamic acid does not satisfy the above relationship, a polyimide having an improved mechanical strength, especially folding endurance, may not be obtained.

Further, there have been problems in handling a polyamic acid (polyimide precursor), for example, degradation of operability in applying the polyamic acid to form a belt. Moreover, there has been demand for further improvements in mechanical strength of a polyimide obtained by imidizing the polyamic acid.

In this regard, according to the polyamic acid composition including a polyamic acid that is obtained by a reaction that satisfies the above Formula (1), a polyamic acid having a stable viscosity may be obtained and a polyimide having an improved mechanical strength, especially folding endurance, may be obtained.

In Formula (1), when the value of Y/X is equal to or less than 0.970, it is presumed that the solution viscosity of the polyamic acid composition may be too low and, as a result, it may be difficult to form a belt or the like due to dripping of the composition during the application of the same, and the mechanical strength of the obtained polyimide may deteriorate. On the other hand, when the value of Y/X is equal to or more than 0.998, it is presumed that the solution viscosity of the polyamic acid may be too high and, as a result, operability in applying the composition to form a belt or the like may deteriorate.

In Formula (1), the value of Y/X is preferably within a range of from 0.975 to 0.997, more preferably from 0.985 to 0.995, particularly preferably from 0.987 to 0.993.

In Formula (2), the value of Z/2(X−Y) is preferably within a range of from 0.03 to 0.47, more preferably from 0.05 to 0.40, yet more preferably from 0.10 to 0.30, particularly preferably from 0.15 to 0.20.

The method of analyzing whether or not the polyamic acid in this exemplary embodiment is obtained by a reaction that satisfies the relationship of Formulae (1) and (2) will be described later.

-Imidization Degree-

The polyamic acid according to this exemplary embodiment has an imidization degree of from 5.0% or about 5.0% to 25.0% or about 25.0%, more preferably from 7.0% to 20.0%, particularly preferably from 8.0% to 15.0%. The imidization degree of the polyamic acid may be regulated by adjusting the reaction temperature or the polymerization time during the preparation of the polyamic acid, as described in the "polymerization method of polyamic acid" as described later.

The imidization degree in the present specification is measured in accordance with an IR method including the following processes.

1) Obtain film A having a thickness of more than ten micrometers from a composition in which a polyamic acid is dissolved in an organic solvent such as N-methyl-pyrrolidone, by applying the same onto a substrate of glass or a fluororesin by an immersion method or a spin coating method.

2) Obtain film B by immersing film A in a poor solvent to the polyamic acid having a boiling point of less than 100° C., such as THF (tetrahydrofuran), at 25±5° C. for 3 minutes to remove the organic solvent and allow the polyamic acid to precipitate.

3) Obtain film C (measurement sample) by vacuum-drying film B, at 25±5° C. for 15 minutes with a pressure of −0.08 MPa, and then peeling off the dried polyamic film from the substrate.

4) Measure the absorption peak derived from an imide ring and the absorption peak derived from an aromatic ring (internal standard), of film C by a transmission method, using an IR spectrometer (product number: FT-730, manufactured by Horiba, Ltd.)

5) Obtain film D (standard sample with 100% imidization degree) by sintering film C for 2 hours at a temperature of not less than the glass transition temperature (Tg) of the polyimide that forms film C, and then measure the absorption peak derived from an imide ring and the absorption peak derived from an aromatic ring (internal standard) of film D using an IR spectrometer in accordance with the above method.

6) Calculate the imidization degree in accordance with the following formula (3).

$$\text{Imidization degree (\%)} = \{(\text{absorption peak of film C derived from imide ring/absorption peak of film C derived from aromatic ring (internal standard)})\}/\{(\text{absorption peak of film D derived from imide ring/absorption peak of film D derived from aromatic ring (internal standard)})\} \times 100\% \quad \text{Formula (3)}$$

When the polyamic acid is in the form of a solid, the imidization degree can be measured using a KBr powder in accordance with the aforementioned method. The above-mentioned method is advantageous in view of the circumstances in which measurement of the true imidization degree of polyamic acid is difficult due to a rapid progress of imidization reaction of the polyamic acid promoted by heating or the like.

It is known that the dehydration reaction (imidization reaction) of a polyamic acid caused by its amide group and carboxylic group occurs in a successive manner. In this regard, when the imidization reaction occurs, an imide closed-ring structure is formed and the movement of the molecule may be inhibited by this structure. As a result, the fluidity of the polyamic acid in the form of a solution is expected to decrease. By regulating the imidization degree to a range as specified above, the polyimide obtained from the polyamic acid composition according to this exemplary embodiment may achieve improved mechanical strength (especially folding endurance), while maintaining favorable fluidity of the polyamic acid composition.

The reason why the above effects are achieved is not exactly clear, but it is presumed that since a portion of the polyamic acid that has been imidized is present in the solution as if it is dispersed therein as a rigid portion, and this rigid portion is molecularly-oriented when the solution is applied to a substrate, whereby a reinforcing effect may be achieved upon imidization.

-Combination of Polyamic Acid Obtained from Reaction at an Amount Ratio that Satisfies Formulae (1) and (2) and Imidization Degree- The effect of highly stable viscosity of the polyamic acid composition according to this exemplary embodiment may be achieved by satisfying the relationship of Formulae (1) and (2) and an imidization degree within the specified range. Further, the polyimide film obtained by applying this polyamic acid composition onto a substrate and then sintering (imidizing) the same exhibits an improved mechanical strength, especially folding endurance or the like. The reason why the above effects are achieved is not exactly clear, but it is presumed to be a result of controlling the mobility with respect to the terminal end and the main chain of the polyamic acid.

In the following, the components of the polyamic acid composition according to this exemplary embodiment will be described.

(Polyamic Acid)

The polyamic acid used in the polyamic acid composition according to this exemplary embodiment it not particularly limited, as long as it is obtained by reacting the components at an amount ratio as specified above, and has an imidization degree as specified above.

The main skeleton of the polyamic acid can be represented by, for example, the following Structural Formula (1).

Structural Formula (1)

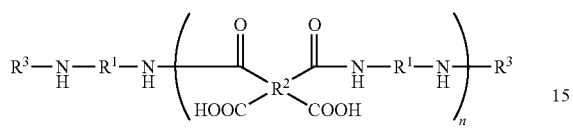

In the Structural Formula (1), $R^1$ represents a divalent aromatic residue or a divalent aliphatic residue; $R^2$ represents a tetravalent aromatic residue or a tetravalent apliphatic residue; n represents a positive number; $R^3$ represents a terminal end of the molecule, which is a hydrogen atom or an organic group derived from the acid monoanhydride, and this organic group excluding the hydrogen atom therefrom satisfies the relationship of $0.00 < Z/2\,(X-Y) < 0.50$.

Specific examples of $R^1$ include the following structures.

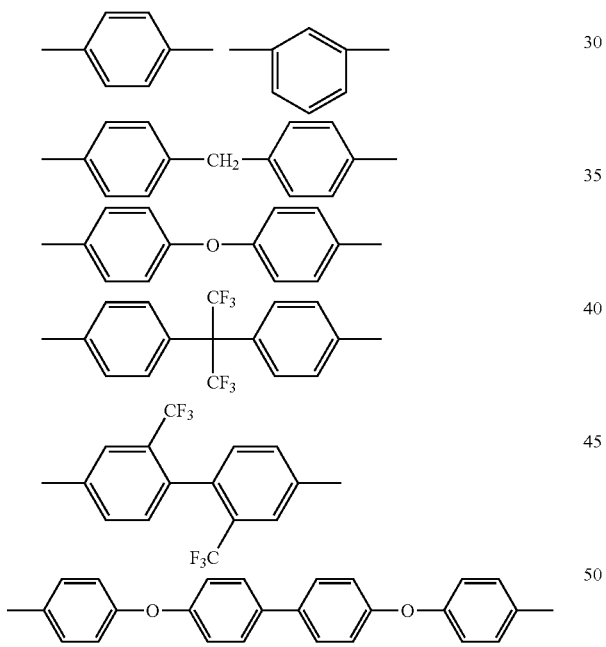

Specific examples of $R^2$ include the following structures.

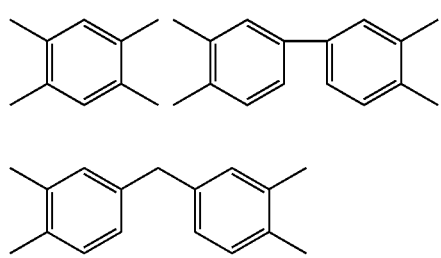

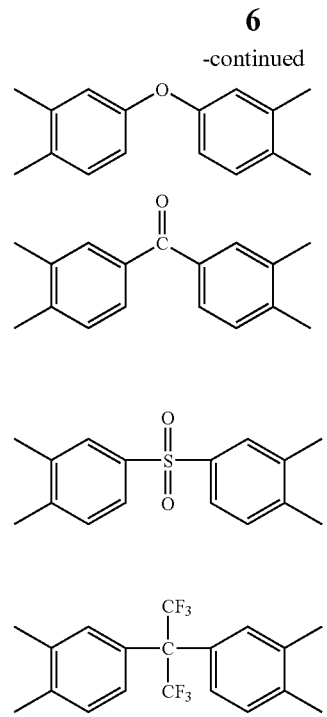

Specific examples of $R^3$, except hydrogen, include the following structures.

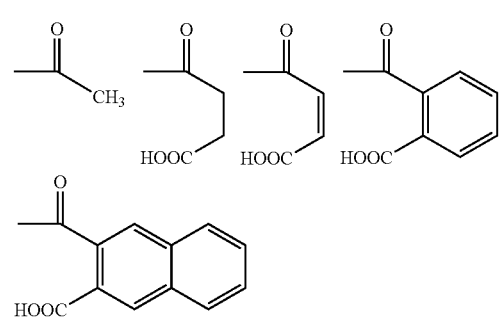

Part of the hydrogen atoms of the aforementioned aromatic residue or the aliphatic residue may be substituted by an alkyl group, a hydroxyl group or the like, as long as the structure is known. These structures may be used alone or in combination of two or more.

Preferable structures of the polyimide obtained using the polyamic acid composition according to this exemplary embodiment include the following.

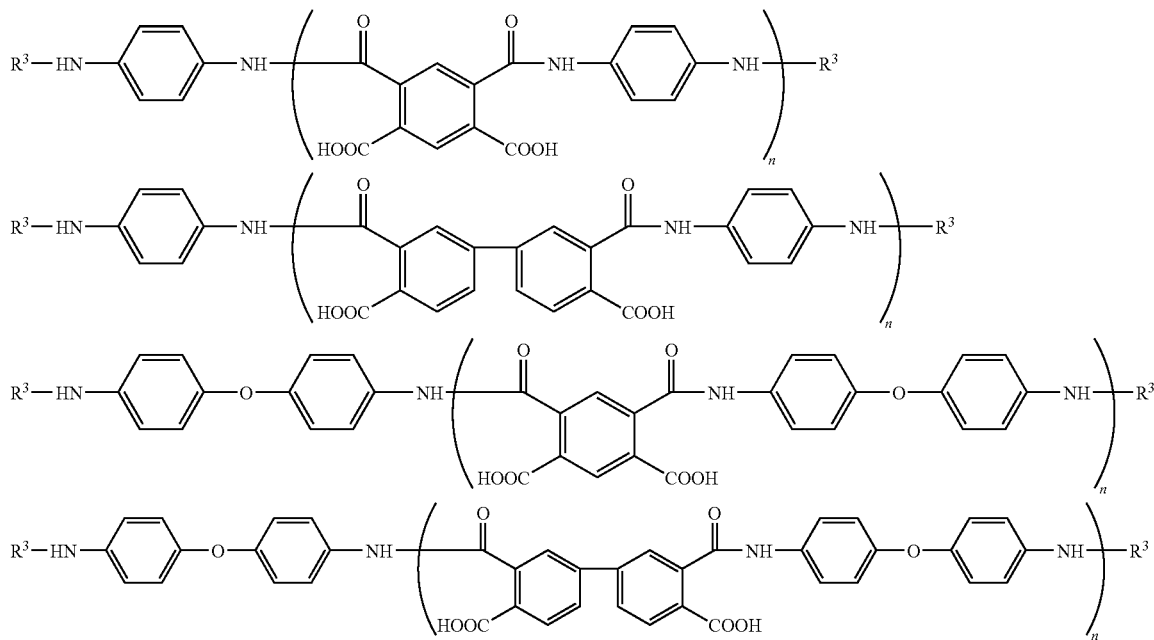

In the following, a method of analyzing the structure of the polyamic acid will be described.

First, methanol is added to a solution including the polyamic acid composition to allow the polyamic acid to reprecipitate. Then, this reprecipitation of the polyamic acid is placed in a pressure-resistant bottle, and an aqueous solution of 1N sodium hydroxide is added thereto. Then, the content of the bottle is treated at 100° C. for 2 hours to obtain a hydrolysate of the polyamic acid. Subsequently, this hydrolysate is subjected to extraction with chloroform, and the structure and the amount of a diamine component (derived from the diamine compound) are determined from a concentrated liquid of a chloroform phase by IR spectroscopy, nuclear magnetic resonance spectroscopy and gas chromatography. Further, the aqueous phase of the hydrolysate (insoluble to a chloroform phase) is neutralized and freeze-dried, thereby obtaining a dry solid. This solid is subjected to extraction with methanol, and the structure and the amount of a carboxylic acid component (derived from tetracarboxylic dianhydride and the acid monoanhydride) are determined from the dissolved substance by IR spectroscopy, nuclear magnetic resonance spectroscopy and gas chromatography.

Whether or not the polyamic acid as described here satisfies the Formulae (1) and (2) is determined in accordance with the above method.

The molecular weight of the polyamic acid according to this exemplary embodiment is not particularly limited, but in the above Structural Formula (1), n is preferably from 50 to 1000, more preferably from 100 to 500, and particularly preferably from 150 to 300.

The unit number (n) can be determined by measuring the weight average molecular weight of the polyamic acid by a GPC method as described above, and calculating the total molecular weight per unit by adding the molecular weight per unit of the tetracarboxylic dianhydride and the molecular weight per unit of the diamine compound, and then dividing the weight average molecular weight by the total molecular weight per unit.

The GPC (gel permeation chromatography) can be performed, for example, by using a GPC measuring device (HLS-8120GPC, trade name, manufactured by Tosoh Corporation) with a column (TSK GEL series, trade name, manufactured by Tosoh Corporation) and an eluting solution (N-methylpyrrolidone with 1 mM of lithium bromide and 1 mM of phosphoric acid). It should be noted that since a polyamic acid is chemically unstable, depolymerization reaction may occur to reduce the molecular weight thereof, depending on the measurement conditions. Therefore, even in the GPC method, the measurement is preferably conducted within 5 hours from the preparation of the samples.

(I) Diamine Compound

The diamine compound used in this exemplary embodiment is not particularly limited as long as it has two amino groups in its structure, and is used in the polymerization reaction of a polyamic acid.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethyl indane, 6-amino-1-(4'-aminophenyl)-1,3,3-trimethyl indane, 4,4'-diaminobenzanilide, 3,5-diamino-3'-trifluoromethyl benzanilide, 3,5-diamino-4'-trifluoromethyl benzanilide, 3,4'-diaminodiphenyl ether, 2,7-diamino fluorene, 2,2-bis(4-aminophenyl)hexafluoro propane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)biphenyl, 1,3'-bis(4-aminophenoxy)benzene, 9,9-bis(4-aminophenyl)fluorene, 4,4'-(p-phenylene isopropylidene)bisaniline, 4,4'-(m-phenylene isopropylidene)bisaniline, 2,2'-bis[4-(4-amino-2-trifluoromethylphenoxy)phenyl] hexafluoropropane, and 4,4'-bis[4-(4-amino-2-trifluoromethyl)phenoxy]-octafluorobiphenyl; aromatic diamines having two amino groups that are bonded to an aromatic ring and a hetero atom other than the nitrogen atom in the amino groups, such as diaminotetraphenyl thiophene; aliphatic diamines such as 1,1-meta-xylylene diamine, 1,3-propane diamine, tetramethylene diamine, pentamethylene diamine, octamethylene diamine, nonamethylene diamine, 4,4-diaminoheptamethylene diamine, 1,4-diamino cyclohexane, isophorone diamine, tetrahydrodicyclopentadienylene diamine, hexahydro-4,7-metanoindanylene dimethylene diamine, tricyclo[6.2.1.02.7]-undecylene dimethyl diamine, and 4,4'-methylenebis(cyclohexylamine), and alicyclic diamines. These diamine compounds may be used alone or in combination of two or more kinds.

Among the above diamine compounds, p-phenylenediamine, 4,4'-diaminodiphenyl methane, 4,4'-diaminodiphenyl ether, 4,4'-diaminodiphenyl sulfide and 4,4'-diaminodiphenyl sulfone are preferred, and p-phenylenediamine and 4,4'-diaminodiphenyl ether are more preferred.

(II) Tetracarboxylic Dianhydride

The tetracarboxylic dianhydride used in this exemplary embodiment is not particularly limited as long as it can be used in the polymerization reaction of a polyamic acid.

Examples of the tetracarboxylic dianhydride include pyromellitic dianhydride, 3,3', 4,4'-benzophenone tetracarboxylic dianhydride, 3,3',4,4'-biphenylsulfone tetracarboxylic dianhydride, 1,4,5,8-naphthalene tetracarboxylic dianhydride, 2,3,6,7-naphthalene tetracarboxylic dianhydride, 3,3',4,4'-biphenylether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furan tetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidene diphthalic dianhydride, 3,3',4,4'-biphenyl tetracarboxylic dianhydride, bis(phthalic)phenylphosphine oxide dianhydride, p-phenylene-bis(triphenylphthalic)dianhydride, m-phenylene-bis(triphenyl phthalic)dianhydride, bis(tripheylphthalic)-4,4'-dipheylether dianhydride, and bis(tripheylphalic)-4,4'-dipheylmethane dianhydride.

Examples of the aliphatic tetracarboxylic dianhydride include aliphatic or alicyclic tetracarboxylic anhydrides, such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentylacetic dianhydride, 3,5,6-tricarboxynorbornane-2-acetic dianhydride, 2,3,4,5-tetrahydrofuran tetracarboxylic dianhydride, 5-(2,5-dioxotetrahydrofuranyl)-3-methyl-3-cyclohexene-1,2-dicarboxylic dianhydride, and bicyclo[2.2.2]-oct-7-ene-2,3,5,6-tetracarboxylic dianhydride; and aliphatic tetracarboxylic dianhydrides having an aromatic ring, such as 1,3,3a,4,5,9b-hexahydro-2,5-dioxo-3-franyl)-naphth[1.2-c]furan-1,3-dione, 1,3,3a,4,5,9b-hexahydro-5-methyl-5-(tetrahydro-2,5-dioxo-3-franyl)-naphth[1,2-c]furan-1-3-dione, and 1,3,3a,4,5,9b-hexahydro-8-methyl-5-(tetrahydro-2,5-dioxo-3-franyl)-naphth[1,2-c]furan-1-3-dione. These tetracarboxylic dianhydrides may be used alone or in combination of two or more kinds.

Among the above tetracarboxylic anhydrides, aromatic tetracarboxylic anhydrides are preferred; pyromellitic dianhydride, 3,3',4,4'-biphenyl tetracarboxylic dianhydride and 3,3',4,4',biphenylsulfone tetracarboxylic dianhydride are more preferred; and pyromellitic anhydride and 3,3',4,4'-biphenyl tetracarboxylic dianhydride are particularly preferred.

(III) Acid Monoanhydride

The acid monoanhydride used in this exemplary embodiment is not particularly limited, and a known compound may be used as long as it reacts with an amine.

Examples of the acid monoanhydride include acetic anhydride, maleic anhydride, phthalic anhydride, 2,3-benzophenone dicarboxylic anhydride, 3,4-benzophenone dicarboxylic anhydride, 2,3-dicarboxyphenphenylether anhydride, 3,4-dicarboxyphenylphenylether anhydride, 2,3-biphenyldicarboxylic anhydride, 3,4-biphenyldicarboxylic anhydride, 2,3-dicarboxyphenylphenyl sulfonic anhydride, 3,4-dicarboxyphenylphenyl sulfonic anhydride, 2,3-dicarboxyphenylphenyl sulfide anhydride, 3,4-dicarboxyphenylphenyl sulfide anhydride, 1,2-naphthalene dicarboxylic anhydride, 2,3-naphthalene dicarboxylic anhydride, 1,8-naphthalene dicarboxylic anhydride, 1,2-anthracene dicarboxylic anhydride, 2,3-anthracene dicarboxylic anhydride, and 1,9-anthracene dicarboxylic anhydride. These compounds may be partly substituted, as long as it does not exhibit reactivity with respect to an amine or a carboxylic anhydride. These compounds may be used alone or in combination of two or more kinds.

The acid monoanhydride is preferably maleic anhydride or phthalic anhydride.

Polymerization Method of Polyamic Acid

The polyamic acid used in this exemplary embodiment is obtained by polymerizing (I) a diamine compound, (II) a tetracarboxylic dianhydride and (III) an acid monoanhydride, in an amount ratio as specified by the following formulae (1) and (2).

$$0.970 < Y/X < 0.998 \quad \text{Formula (1)}$$

$$0.00 < Z/2(X-Y) < 0.50 \quad \text{Formula (2)}$$

In formulae (1) and (2), X represents the content of the diamine compound (mol), Y represents the content of the tetracarboxylic dianhydride (mol), and Z represents the content of the acid monoanhydride (mol).

As mentioned above, the imidization degree of the polyamic acid can be controlled to be within a range of from 5.0% or about 5.0% to 25.0% or about 25.0%, by adjusting the reaction temperature and/or the polymerization time.

The polymerization method of the polyamic acid according to this exemplary embodiment is not particularly limited, and any known method such as those described below is applicable.

Dissolution method: a method of formulating a diamine compound, a tetracarboxylic dianhydride and an acid monoanhydride so as to satisfy the range as specified by Formulae (1) and (2), and then polymerizing these components at high temperature without using a solvent.

Solution method: a method of formulating a diamine compound, a tetracarboxylic dianhydride and an acid monoanhydride so as to satisfy the range as specified by Formulae (1) and (2), and then polymerizing these components with the addition of a solvent.

Diester dicarboxylic acid method: a method of previously treating a tetracarboxylic dianhydride with an alcohol to convert to a diester dicarboxylic acid, and then performing the polymerization.

Among these methods, a solution method using a solvent is preferred.

The solvent may be a known organic polar solvent. Specific examples of such a solvent include sulfoxide solvents such as dimethyl sulfoxide and diethyl sulfoxide; formamide solvents such as N,N-dimethylformamide and N,N-diethylformamide; acetamide solvents such as N,N-dimethylacetoamide and N,N-diethylacetoamide; pyrrolidone solvents such as N-methyl-2-pyrrolidone and N-vinyl-2-pyrrolidone; phenol solvents such as phenol, o-cresol, m-cresol, p-cresol, xylenol, halogenated phenol and catechol; ether solvents such as tetrahydrofuran, dioxane and dioxolane; alcohol solvents such as methanol, ethanol and butanol; cellosolve solvents such as butyl cellosolve; hexamethylphosphoramide; and γ-butyrolactone.

The method of adding and polymerizing the diamine compound, tetracarboxylic dianhydride and acid monoanhydride is not particularly limited, but examples thereof include the following methods (1) to (3).

(1) One-step method: a method in which the three components are mixed in a solvent, and are polymerized.

(2) Multi-step method: a method in which X mol of the diamine compound is dissolved in a solvent, and then Y mol of the tetracarboxylic dianhydride and Z mol of the acid monoanhydride are gradually added thereto in several steps.

(3) Blend method: a method in which X/2 mol of the diamine compound is dissolved in a solvent and mixed with Y/2 mol of the tetracarboxylic dianhydride to polymerize in a first batch, while X/2 mol of the diamine compound is dissolved in a solvent and mixed with Y/2 mol of the tetracarboxylic dianhydride and Z mol of the acid monoanhydride to polymerize in a second batch, and then the first batch and the second batch are finally blended.

Any of the above method can be used as long as the amount ratio of the component of Formulae (1) and (2) is satisfied. These methods may be used alone or in combination thereof.

The conditions for the polymerization in the above dissolution method is not particularly limited, but the reaction temperature is preferably from 30° C. to less than 90° C., more preferably from 40° C. to less than 80° C., and particularly preferably from 50° C. to less than 75° C. The polymerization time is not particularly limited as long as the polymerization reaction occurs to a sufficient degree. The degree of polymerization can be determined by measuring the molecular weight or the molecular weight distribution by a GPC method; or in a more convenient manner, measuring the time by which the change in viscosity of the solution becomes constant. In this exemplary embodiment, the polymerization time is typically from several hours to about 48 hours.

The solid content concentration of the polyamic acid is not particularly limited, but preferably from 5% to 50% by weight, more preferably from 10% to 30% by weight.

The polyamic acid composition according to this exemplary embodiment may include known additives or fillers. Examples of the additives or fillers include silicone defoaming agents, conductive carbon black such as acidic carbon black, Ketjen black and acetylene black, inorganic compounds such as titanium oxide, zinc oxide and metal powder, aliphatic ester-based antistatic agents, polymeric conductive compounds such as polyaniline, and the like. Glass fiber, mica, talc, calcium carbonate, silica, PTFE, silicone rubber and the like are also applicable as reinforcing agents, sliding agents, thermal conductive materials, elasticizers, and the like.

<Second Exemplary Embodiment: Polyimide Endless Belt>

The polyimide endless belt according to this exemplary embodiment is obtained by applying the polyamic acid composition according to the first exemplary embodiment to a surface of a cylindrical substrate or the like, and then imidizing the polyamic acid by heating the same or the like.

In the following, one exemplary method of forming a polyimide endless belt including applying the polyamic acid composition onto a cylindrical substrate is described.

The cylindrical substrate is preferably a cylindrical metal mold. Alternatively, a mold formed from a known material such as resin, glass or ceramics may be suitably used. It is also possible to provide the surface of the substrate with a glass coating or a ceramic coating, or using a silicone-based or fluorine-based releasing agent.

Further, irregularities in a thickness direction of the composition that is applied onto the substrate surface is preferably reduced by passing, through the cylindrical substrate, a thickness-regulating substrate having an adjusted clearance with respect to the cylindrical substrate. If the irregularities in thickness of the composition are suppressed in the process of applying the composition onto the substrate surface, the above process may not be conducted.

Either the internal surface or the outer surface of the cylindrical substrate may be used as the substrate surface.

Examples of the solvent used for the application of the polyamic acid composition according to this exemplary embodiment include sulfoxide solvents such as dimethyl sulfoxide and diethyl sulfoxide, formamide solvents such as N,N-dimethylformamide and N,N-diethylformamide, acetoamide solvents such as N,N-dimethylacetoamide and N,N-diethylacetoamide, pyrrolidone solvents such as N-methyl-2-pyrrolidone and N-vinyl-2-pyrrolidone, phenol solvents such as phenol, o-cresol, m-cresol, p-cresol, xylenol, halogenated phenol and catechol, ether solvents such as tetrahydrofuran, dioxane and dioxolane, alcohol solvents such as methanol, ethanol and butanol, cellosolve solvents such as butyl cellosolve, hexamethylphosphoramide, and γ-butyrolactone.

These solvents may be used alone or in combination of two or more. Further, aromatic hydrocarbons such as xylene or toluene are also applicable. The solvent is not particularly limited as long as it can dissolve a polyamic acid or a polyamic acid/polyimide copolymer.

The solvent used for the application may be the solvent used during the preparation of the polyamic acid according to the first exemplary embodiment, or may be a solvent to replace after the polymerization of the polyamic acid. The replacement of the solvent may be performed by a method of adding a solvent to the polyamic acid solution to dilute the same, a method of re-dissolving the polymer recovered by re-precipitation in the solvent, or a method of adjusting the composition by adding a solvent while gradually distilling away the solvent that is included in the composition.

Subsequently, the cylindrical substrate onto which the polyamic acid composition is applied is placed in a heated environment, and dried so that 20% by weight or more, more preferably 60% by weight or more of the solvent is evaporated from the composition. The solvent may remain in the composition as long as its surface is dried and does not flow even when it is tilted. The drying is preferably conducted at a temperature of from 50° C. to 200° C.

After the drying, the polyamic acid composition is imidized. The imidization is preferably conducted by heating the cylindrical substrate onto which the polyamic acid composition is applied so as to promote the imidization reaction to a sufficient degree. The heating temperature is not particularly limited as long as it is equal to or higher than the glass transition temperature of the obtained polyimide, and may differ depending on the type of the tetracarboxylic dianhydride or the diamine compound used as a raw material. The heating is preferably conducted at a temperature at which imidization is completed, i.e., equal to or higher than the glass transition temperature of the obtained polyimide. For example, the heating is conducted at a temperature of from 60° C. to 500° C., preferably from 100° C. to 400° C.

The imidization may be conducted by chemical imidization as described below.

In the method of chemical imidization, a dehydration agent and/or a catalyst is added to the polyamic acid composition so as to chemically promote the imidization reaction. The dehydration agent is not particularly limited as long as it is a monovalent carboxylic anhydride, such as acetic anhydride, propionic anhydride, trifluoroacetic anhydride, butanoic anhydride, and oxalic anhydride. These monovalent carboxylic anhydrides may be used alone or in combination of two or more. The dehydration agent is preferably used in an amount of from 0.01 mol to 2 mol per 1 mol of repeating unit of the polyamic acid.

Examples of the catalyst include pyridine, picoline, collidine, lutidine, quinoline, isoquinoline, and tertiary amines such as triethylamine, but the catalyst is not particularly limited thereto. The catalyst may be used alone or in combination of two or more. The catalyst is preferably used in an amount of from 0.01 mol to 2 mol per 1 mol of the dehydration agent.

The chemical imidization reaction may be performed by adding the dehydration agent and/or the catalyst in the polyamic acid composition solution, and heating as necessary. The reaction temperature for dehydration ring closing is typically from 0° C. to 180° C., preferably from 60° C. to 150° C.

The dehydration agent and/or the catalyst that has acted on the polyamic acid may not be removed, but may be removed by a method of heating under reduced pressure, re-precipitation or the like. The heating under reduced pressure can be performed at a temperature of from 80° C. to 120° C. under vacuum so as to remove a tertiary amine used as a catalyst, an unreacted dehydration agent and a hydrolyzed carboxylic acid. The re-precipitation can be performed by adding the reaction solution in a large excess of a poor solvent that can dissolve the catalyst, unreacted dehydration agent and hydrolyzed carboxylic acid but does not dissolve the polyamic acid-polyimide copolymer. The poor solvent is not particularly limited, and examples thereof include water, alcohol solvents such as methanol and ethanol, ketone solvents such as acetone and methyl ethyl ketone, and hydrocarbon solvents such as hexane. The polyamic acid-polyimide copolymer obtained by re-precipitation is filtered and dried, and then dissolved again in a solvent such as γ-butyrolactone, N-methyl-2-pyrrolidone or the like.

Thereafter, the resin is separated from the cylindrical substrate, thereby obtaining a polyimide endless belt.

The aforementioned method of producing a polyimide endless belt according to the second exemplary embodiment is not particularly limited to the above specific examples, and may be subjected to further improvements or modifications based on the knowledge of one of ordinary skill. Further, the polyimide endless belt may be used as a roller without separating from the cylindrical substrate.

(Fluororesin Layer)

The polyimide endless belt according to the second exemplary embodiment may have a fluororesin layer on the surface thereof. The fluororesin layer is provided in order to provide releasability, which is particularly effective with respect to a toner when the polyimide endless belt is used as a fixing member in an image formation device.

-Combination of Polyimide Endless Belt Obtained from Polyamic Acid According to The First Exemplary Embodiment and Fluororesin Layer- The polyamic acid composition according to the first exemplary embodiment includes a polyamic acid having its terminal ends (i.e., amino group that is hydrophilic) blocked by an acid monoanhydride to a moderate degree, and having an imidization degree that has been previously increased to a certain degree. As a result, it is presumed that the polyamic acid has a relatively less amount of carboxylic groups in the main chain. Therefore, it is presumed that excellent adhesion with respect to a fluororesin can be obtained due to the presence of a moderate amount of reactive groups in the polyamic acid.

Examples of the fluororesin include polytetrafluoroethylene (PTFE), tetrafluoroethylene-perfluoroalkylvinylether copolymer (PFA), and tetrafluoroethylene-hexafluoropropylene copolymer (FEP). The fluororesin may include a carbon powder dispersed therein.

The formation of the above fluororesin layer is not particularly limited, and may be conducted by known methods. One exemplary method of producing a polyimide endless belt having a fluororesin layer formed thereon includes forming a layer on the surface of a cylindrical substrate or the like by applying the polyamic acid composition according to the first exemplary embodiment, further applying an aqueous dispersion containing a fluororesin onto the polyamic acid composition layer to form a multilayered structure, and then performing heating/sintering of the multilayered structure to imidize the polyamic acid. The thickness of the fluororesin layer is preferably from 20 μm to 30 μm.

When the adhesion between the applied polyamic acid composition and the fluororesin cannot be achieved to a sufficient degree, a primer layer may be formed on the polyamic acid layer.

Examples of the material for the primer layer include polyphenylene sulfide, polyether sulfone, polysulfone, polyamide imide, polyimide, and derivatives thereof. The primer layer preferably further includes at least one kind of fluororesin such as those as mentioned above. The thickness of the primer layer is preferably from 0.5 μm to 10 μm.

The aforementioned method of producing a polyimide endless belt having a fluororesin layer thereon is not particularly limited to the above specific examples, and may be subjected to further improvements or modifications based on the knowledge of one of ordinary skill. Further, the polyimide endless belt having a fluororesin layer thereon may be used as a roller without separating from the cylindrical substrate.

<Third Exemplary Embodiment: Image Formation Device>

The image formation device according to the third exemplary embodiment includes one or more endless belts, and at least one of these is a polyimide endless belt according to the second exemplary embodiment. The polyimide endless belt according to the second exemplary embodiment is applicable as an intermediate transfer belt, a transfer/delivery belt, a delivery belt, a fixing belt or the like, in diverse applications such as an electrophotographic copier, a laser beam printer, a facsimile machine, or a combination thereof.

A known structure may be employed in the image formation device according to the third exemplary embodiment, as long as the device includes at least one endless belt. For example, the image formation device may include an image retention member, a charging member that charges the surface of the image retention member, an exposure member that exposes the surface of the image retention member to light to form an electrostatic latent image, the developing member that develops the electrostatic latent image that has been formed on the surface of the image retention member with a developer to form a toner image, a transfer member that transfers the toner image that has been formed on the surface of the image retention member to a recording medium, a fixing member that fixes the toner image onto the surface of the recording medium, and a cleaning member that removes the toner or other substances attached to the surface of the image retention member after the transfer of the toner image. The image formation device may further include a known member, as necessary.

In the following, details of the image formation device according to the third exemplary embodiment will be described with reference to an exemplary image formation device according to the third exemplary embodiment.

FIG. 1 is a schematic view of an image formation device including an intermediate transfer member and a fixing member. This image formation device includes intermediate transfer belt 2 and fixing belt 52, and each of these belts is a polyimide endless belt.

The above image formation device includes image retention member (photoreceptor) 1 that retains a toner image, developing member 6 that supplies toner to image retention member 1, intermediate transfer belt 2 that moves in a circular manner and delivers the toner on image retention member 1 from a first transfer position to a second transfer position, conductive roller 25 that is a transfer electrode that transfers the toner on image retention member 1 to intermediate transfer belt 2 at the first transfer position, bias roller 3 that is a transfer electrode placed at the second transfer position on the surface side of intermediate transfer belt 2 for retaining the toner image, back-up roller 22 positioned on the opposite side of bias roller 3 via intermediate transfer belt 2, electrode roller 26 that contacts back-up roller 22 and is rotated by the same, support rollers 21, 23 and 24 that support intermediate transfer belt 2 and guide the circular movement of the same, recording medium storage member 4 that stores and supplies recording medium 41, supply roller 42 that supplies recording medium 41 from recording medium storage member 4, delivery path 43 through which recording medium having a toner image transferred thereon is delivered, and fixing member 5 having fixing belt 52. Intermediate transfer belt 2 is supported by back-up roller 22 and support rollers 21, 23 and 24, thereby forming belt supporting member 28.

The operation of this image formation device will be described below.

Image retention member 1 is rotated in a direction indicated by arrow A, and its surface is charged by a charging member (not shown). An electrostatic latent image is formed on the charged image retention member 1 by irradiating with laser beam by an image writing member (not shown).

This electrostatic latent image is visualized by toner that is supplied from developing member 6 to form a toner image T. Toner image T is delivered by the rotation of image retention member 1 to the first transfer position at which conductive roller 25 is positioned. At this position, a voltage having an opposite polarity to the charges of the toner of toner image T is applied by conductive roller 25 so that toner image T is electrostatically adsorbed to intermediate transfer belt 2. Since intermediate transfer belt 2 moves in a direction of arrow B while contacting the surface of image retention member 1 at the first transfer position, toner image T is sequentially adsorbed to intermediate transfer belt 2 along with its movement (first transfer). Toner image T is delivered by the circular movement of intermediate transfer belt 2 to the second transfer position at which bias roller 3 is positioned.

Recording medium 41 is supplied to a portion formed by intermediate transfer belt 2 and bias roller 3 at the second transfer position, at a predetermined timing by supply roller 42, from recording medium storage member 4. At this position, a voltage having the same polarity as toner image T is applied from electrode roller 26 through back-up roller 22, while intermediate transfer belt having toner image T is contacted to recording medium 41 by bias roller 3 and back-up roller 22, whereby toner image T is adsorbed to recording medium 41. Since intermediate transfer belt 2 moves in a direction of arrow B in a circular manner together with recording medium 41 at the second transfer position, toner image T on intermediate transfer belt 2 is sequentially adsorbed to recording medium 41 along with the movement of intermediate transfer belt 2 (second transfer).

Recording medium 41 to which toner image T is transferred is delivered toward fixing member 5 through delivery path 43. As specifically described below by referring to FIG. 2, toner image T is fixed on recording medium 41 by applying pressure or heat by fixing member 5.

Figure 2:
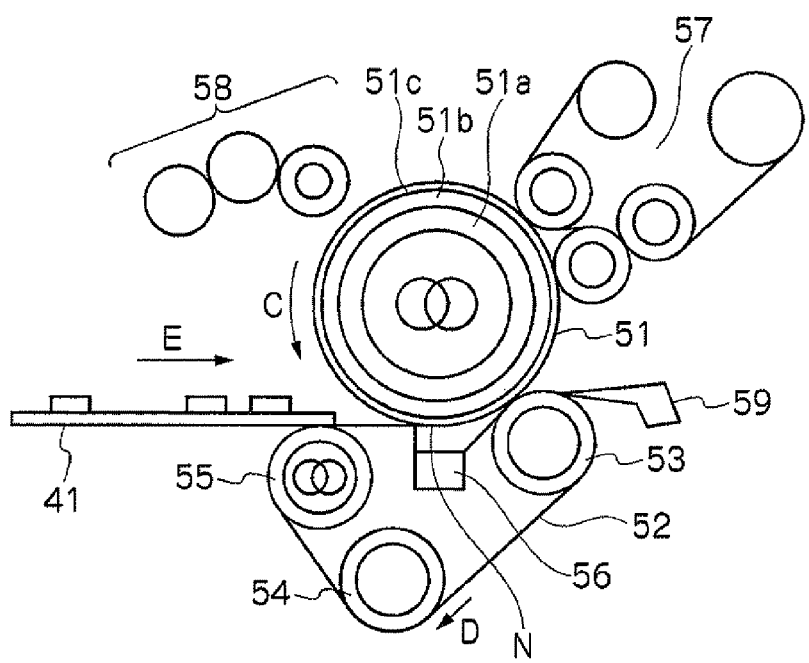
FIG. 2 is a schematic view of a fixing member of the image formation device according to the third exemplary embodiment of the invention.

FIG. 2 is an enlarged schematic view of fixing member 5 in the image formation device shown in FIG. 1.

Fixing member 5 includes fixing roller 51, fixing belt 52, pressing pad 56, first support roller 54, second support roller 55, pressure roller 53, and separator 59.

Fixing roller 51 rotates in a direction of arrow C and includes a hollow roller 51a (for example, an aluminum hollow roller having therein a halogen lamp as a heater), elastic layer 51b (for example, a layer obtained by curing a liquid silicone rubber layer formed on the surface of hollow roller 51a), and heat-resistant/releasing oil-resistant layer 51c (for example, a layer formed by applying a fluororesin on the surface of elastic layer 51b).

Fixing belt 52 is a polyimide endless belt according to the second exemplary embodiment, and is moved by fixing roller 51 in a direction of arrow D in a circular manner.

Pressing pad 56 is formed by, for example, molding a silicone rubber on a metal base in an integral manner, and forms a contact region N having a broad contact width by contacting fixing roller 51 to fixing belt 52.

First support roller 54 supports fixing belt 52.

Second support roller 55 supports fixing belt 52 at a position upstream of contact region N in a circular movement direction of fixing belt 52, and includes a heating member that performs pre-heating of fixing belt 52.

Pressing roller 53 supports fixing belt 52 at a position downstream of contact region N in a circular movement direction of fixing belt 52.

Separator 59 separates recording medium 41 that has passed through contact region N from fixing belt 52.

The portion of fixing belt 52 corresponding to contact region N is supported by second support roller 55 and pressing roller 53 with tension, and pressing roller 53 is pressed against fixing roller 51 by a coil spring (not shown).

Fixing device 5 further includes cleaning member 57 that contacts fixing roller 51 to remove residual toner on the surface of fixing roller 51, and a releasing agent supply member 58 that contacts fixing roller 51 at a portion upstream of contact region N to supply a releasing agent.

In the following, the operation of fixing member 5 will be described.

Recording medium 41 having unfixed toner thereon is delivered through delivery path 43 to a position of fixing belt 52 corresponding second support roller 55. At this position, recording medium 41 is pre-heated together with the unfixed toner by second support roller 55. Fixing belt 52 has a portion that extends to contact region N in a horizontal direction, and recording medium 41 is delivered on this horizontally extended portion in a direction of arrow E to contact region N. When recording medium 41 passes contact region N, fixing roller 51 fixes the toner to recording medium 41 by applying heat and pressure. Since a releasing agent is supplied on fixing roller 51 by releasing agent supply member 58, the toner image is fixed to recording medium 41 with high efficiency. If there is a toner remaining on the surface of fixing roller 51 without being fixed to recording medium 41, this is removed by cleaning member 57. Recording medium 41 onto which the toner is fixed is then delivered from contact portion N to a portion corresponding to separator 59. At this position, recording medium 41 is separated from fixing belt 52 by separator 59, and discharged to a receiving member positioned downstream of fixing member 5 (not shown).

As mentioned above, in the fixing member illustrated by FIG. 2, a polyimide endless belt according to the second exemplary embodiment is used as fixing belt 52.

-Combination of Polyimide Endless Belt Obtained from Polyamic Acid According to The First Exemplary Embodiment and Fixing Member- Since the polyimide endless belt obtained by imidizing the polyamic acid composition according to the first exemplary embodiment exhibits an excellent strength, improvements in durability of the fixing member may be expected by employing this polyimide endless belt in a fixing member. Further, when a fluororesin layer is formed on the polyimide endless belt, improvements in printability may be expected.

The following is another example of the image formation device employing a polyimide endless belt according to the second exemplary embodiment.

Figure 3:
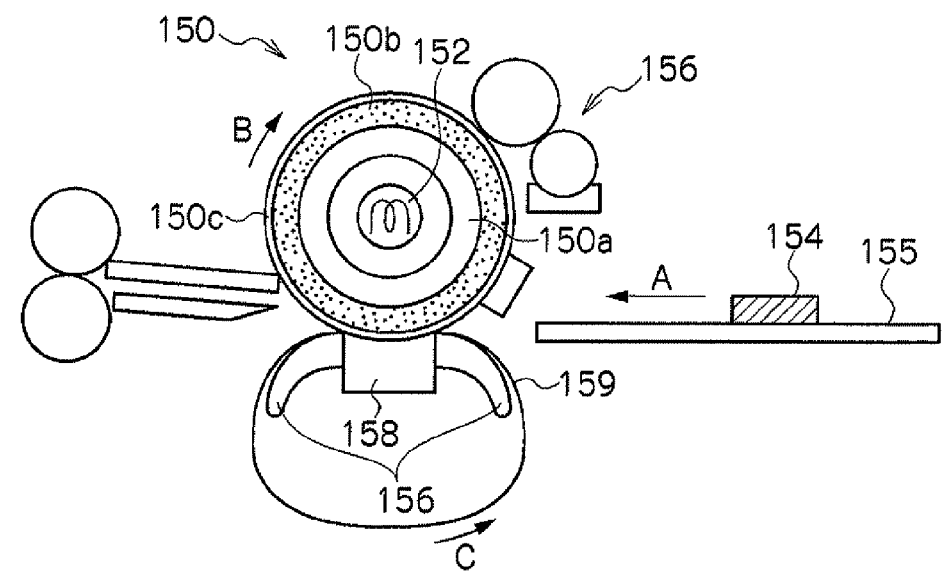
FIG. 3 is a schematic view of another example of the fixing member of the image formation device according to the third exemplary embodiment of the invention.

FIG. 3 is a schematic sectional view of another example of the fixing member. In FIG. 3, heat roller 150 includes substrate 150a, elastic layer 150b formed on substrate 150a from silicone rubber or the like, and releasing layer 150c formed on elastic layer 150b from a fluororesin or the like. Heating lamp 152 is housed in heat roller 150.

Pressing belt 159 includes pressing pad 158 that presses pressing belt 159 from inside thereof against heat roller 150 to form a nip portion. No tension is applied by tension rollers or the like to pressing belt 159 (tension-free). Pressing pad 158 is formed by, for example, placing a silicone sponge on a silicone rubber base and covering the same with a fluororein sheet.

Heat roller 150 is rotated in a direction of arrow B and pressing belt 159 is rotated in a direction of arrow C, following heat roller 150. The orbit of the rotation of pressing belt 159 is maintained constant by guide 156. Recording medium 155 on which unfixed toner image 154 is formed is delivered to the nip portion in a direction of arrow A, at which the toner image is fixed to recording medium 155 by applying heat and pressure.

The following is yet another example of the image formation device according to the third exemplary embodiment.

Figure 4:
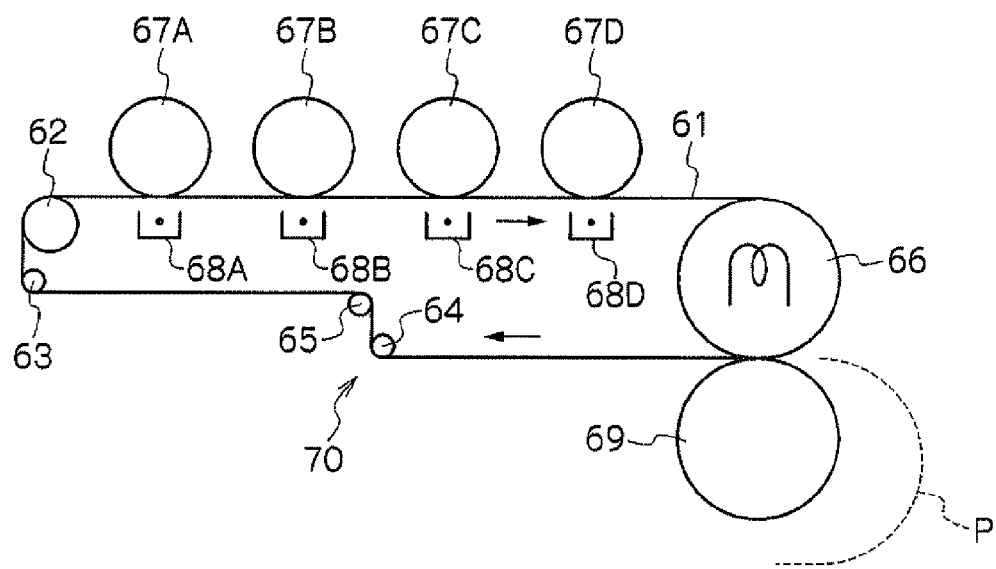
FIG. 4 is a schematic view of an image formation device according to the third exemplary embodiment of the invention that employs a polyimide endless belt as an intermediate transfer-fixing belt.

FIG. 4 is a schematic view of image formation device having an intermediate transfer fixing member. This image formation device includes an intermediate transfer fixing belt 61 that functions as an intermediate transfer belt and as a fixing belt. A polyimide endless belt according to the second exemplary embodiment is used as intermediate transfer fixing belt 61.

In the above image formation device, intermediate transfer fixing belt 61 is supported by driving roller 62, guide rollers 63 and 64, tension roller 65, and heat roller (fixing roller) 66, thereby forming belt supporting member 70. At a portion formed by driving roller 62 and heat roller 66, intermediate transfer fixing belt 61 contacts four photoreceptor drums 67A, 67B, 67C and 67D on which a toner image of a different color is formed, and fixing members 67A, 68B, 68C and 68D are positioned so as to correspond to each photoreceptor drum. Pressing roller (pressing member) 69 is positioned so as to contact heat roller 66.

In the above configuration, toner images of each color are transferred to intermediate transfer fixing belt 61 from photoreceptor drums 67A, 678, 67C and 67D (first transfer). Recording medium P is supplied to a portion between heat roller 66 and pressing roller 69, and a multicolor toner image formed on intermediate transfer fixing belt 61 is transferred on recording medium P (second transfer), and is then fixed with heat.

EXAMPLES

In the following, the invention will be described in further details with reference to the Examples. However, the invention is not limited thereto.

The evaluations described in the Examples and the Comparative Examples are conducted in accordance with the following methods, (1) Measurement of Viscosity of Polyamic Acid Solution The viscosity of the polyamic acid solution is measured using a cone-and-plate viscometer (product number: TV-20, manufactured by Told Sangyo Co., Ltd.) at a measurement temperature of 25° C.

(2) Measurement of Imidization Degree of Polyamic Acid

The imidization degree of the polyamic acid is measured in accordance with the method as described above.

(3) Method of Producing Polyimide Endless Belt

A silicone-based releasing agent is applied onto an outer surface of a cylindrical mold made of SUS having an outer diameter of 90 mm and a length of 450 mm, and then dried (releasing agent treatment). To this cylindrical mold treated with the releasing agent, a polyamic acid solution is applied from a dispenser having an opening diameter of 1.0 mm, while rotating the cylindrical mold in a circumferential direction at a rate of 10 rpm and pressing the polyamic acid solution against the cylindrical mold by a metal blade provided over the cylindrical mold. The polyamic acid solution is applied onto the cylindrical mold in a helical manner by moving the dispenser in an axial direction of the cylindrical mold at a rate of 100 mm/minute. After the application, the blade is detached from the cylindrical mold and leveling is performed by rotating the cylindrical mold for 2 minutes.

Then, the cylindrical mold with the coating formed thereon is placed in a dry oven of a nitrogen atmosphere at 150° C. for 1 hour while rotating the cylindrical mold at 10 rpm, thereby conducting a drying treatment. After the drying, imidization is performed by sintering the cylindrical mold in a clean oven at 380° C. for 2 hours. Thereafter, the cylindrical mold is cooled to 25° C. and the resin coating is separated from the cylindrical mold, thereby obtaining a polyimide endless belt.

The raw materials used for the Examples and the Comparative Examples are as follows.

Polymerization solvent: N-methyl-2-pyrrolidone (NMP)

Diamine compound: p-phenylenediamine (PDA)

Tetracarboxylic dianhydride: 3,3',4,4'-biphenyl tetracarboxylic dianhydride (BPDA)

Acid monoanhydride: phthalic anhydride (PA)

Example 1

Preparation of Polyamic Acid Solution 54.719 g (0.5060 mol) of PDA and 600 g of NMP are mixed and placed in a 1 L separable flask, and the mixture is heated to 70° C. and stirred. 145.344 g (0.494 mol) of BPDA and 0.1481 g (0.0010 mol) of PA are added to 200 g of NMP to form a slurry, and this is gradually dropped in the flask over 30 minutes. Then, the content of the flask is allowed to polymerize for 24 hours while maintaining the temperature at 70° C. and stirring. Thereafter, the reaction solution is filtered with a stainless mesh (#800) to obtain a polyamic acid solution. In this process, the value of Y/X BPDA (mol)/PDA (mol) is 0.976, and Z/2(X−Y)=PA (mol)/2{PDA (mol) BPDA (mol)} is 0.04. The imidization degree is measured in accordance with the method as described above.

-Preparation of Polyimide Endless Belt-

A polyimide endless belt is prepared using the polyamic acid solution obtained in Example 1 in accordance with the method as described above. The results of the evaluation according to the method (described later) are shown in Table 1.

Examples 2 to 15 and Comparative Examples 1 to 16

A polyamic acid solution is prepared in a similar manner to Example 1, while the amount of the components, the reaction temperature, and the reaction time are changed as shown in Tables 1 to 4. Further, a polyimide endless belt is prepared in a similar manner to Example 1 using the obtained polyamic acid solution.

(Evaluation)

-Stability of Polyamic Acid Solution (Viscosity Change Ratio (%))-

10 g of the polyamic acid solution is placed in a 50 ml sample vessel, and the vessel is tightly closed. This vessel is left to stand at 23±5° C. Thereafter, the viscosity of the polyamic acid solution is measured in accordance with the method (1) as described above. The value as measured is expressed by a change ratio (%)=(viscosity as measured after leaving the polyamic acid solution to stand for 30 days)/(viscosity as measured immediately after the preparation of polyamic acid solution)×100. The closer the value is to 100%, the more stable the polyamic acid solution is.

-Tension Test of Polyimide Endless Belt (Tensile Strength and Tensile Elongation)-

The tensile strength and the tensile elongation are measured in accordance with HS-K7127 (1987) using a tensile tester (product number: 1605N, manufactured by Aikoh Engineering Co., Ltd.) at conditions of a chuck distance of 40 mm and a tensile rate of 20 mm/min. The sample for measurement is obtained by cutting the polyimide endless belt to a size of 5 mm×60 mm.

-MIT Test of Polyimide Endless Belt (Folding Endurance)-

The sample is subjected to a reciprocating folding test using an MIT folding endurance tester (manufactured by Yasuda Seiki Seisakusho Ltd.) in accordance with JIS-C5016 (1994), at conditions of a tensile load of 1.0 kg and a folding angle of 135°. The sample for measurement is obtained by cutting the polyimide endless belt to a size of 150 mm×15 mm.

Example 16

Preparation of Polyamic Acid Solution 54.049 g (0.4998 mol) of PDA and 600 g of NMP are mixed and placed in a 1 L separable flask, and the mixture is heated to 70° C. and stirred. 145.951 g (0.4961 mol) of BPDA and 0.2800 g (0.0019 mol) of PA are added to 200 g of NMP to form a slurry, and this slurry is gradually dropped in the flask over 30 minutes. Then, the content of the flask is allowed to polymerize for 24 hours while maintaining the temperature at 70° C. and stirring. Thereafter, the reaction solution is filtered with a stainless mesh (#800) to obtain a polyamic acid solution. In this process, the value of Y/X=BPDA (mol)/PDA (mol) is 0.9925, and Z/2(X−Y)=PA (mol)/2{PDA (mol)−BPDA (mol)} is 0.25. The imidization degree as measured in accordance with the method as described above is 12.0.

Preparation of Polyimide Endless Belt

A polyimide endless belt is prepared in accordance with the following method, rather than the method (3) as described above.

A releasing agent (product number: KS-700, manufactured by Shin-Etsu Chemical Co., Ltd.) is applied by spraying onto an outer surface of an SUS cylindrical mold having an outer diameter of 30 mm and a length of 500 mm, and is treated by sintering at 300° C. for 1 hour. To this cylindrical mold treated with the releasing agent, a polyamic acid solution is applied from a dispenser having an opening diameter of 1.0 mm, while rotating the cylindrical mold in a circumferential direction at a rate of 10 rpm and pressing the polyamic acid solution against the cylindrical mold by a metal blade provided over the cylindrical mold. The polyamic acid solution is applied onto the cylindrical mold in a helical manner by moving the dispenser in an axial direction of the cylindrical mold at a rate of 100 mm/minute. After the application, the blade is detached from the cylindrical mold and leveling is performed by rotating the cylindrical mold for 2 minutes. Thereafter, the cylindrical mold is subjected to a dry treatment in a dry oven of an air atmosphere at 150° C. for 1 hour, while rotating the cylindrical mold at 10 rpm. A dried film of polyamic acid is thus formed.

On the dried film of polyamic acid, a fluororesin layer is formed by applying a fluororesin dispersion (PFA aqueous coating agent, product number: 710CL, manufactured by Du Pont-Mitsui Fluorochemicals Company, Ltd., concentration: 60 wt %, viscosity: 0.6 Pa·s) by dip-coating, thereby forming a layered structure. The withdrawl velocity at the coating process is 200 mm/min Subsequently, imidization and sintering of the fluororesin is performed by subjecting the obtained layered structure to a heating treatment in an oven at 150. ° C. for 20 minutes, 220° C. for 20 minutes, and 380° C. for 30 minutes. Thereafter, the resin is separated from the cylindrical mold, and an endless belt having a layered structure of polyimide and fluororesin is thus obtained.

The obtained endless belt is installed in an electrophotographic printer (trade name: DOCUCENTRE COLOR 400 CP, manufactured by Fuji Xerox Co., Ltd.), and a 200,000-sheet running test is conducted. As a result, no wrinkles in printing paper, breakage of belt edges or image defects are observed either at an initial stage of the test or after the completion of the test.

Comparative Example 17

54.049 g (0.4998 mol) of PDA and 600 g of NMP are mixed and placed in a 1 L separable flask, and the mixture is heated to 70° C. and stirred. 145.951 g (0.4961 mol) of BPDA and 1.1150 g (0.0075 mol) of PA are added to 200 g of NMP to form a slurry, and this slurry is gradually dropped in the flask over 30 minutes. Then, the content of the flask is allowed to polymerize for 24 hours while maintaining the temperature at 70° C. and stirring. Thereafter, the reaction solution is filtered with a stainless mesh (#800) to obtain a polyamic acid solution. In this process, the value of Y/X=BPDA (mol)/PDA (mol) is 0.9925, and Z/2(X−Y)=PA (mol)/2{PDA (mol) BPDA (mol)} is 1.00. The imidization degree as measured in accordance with the method as described above is 12.0.

An endless belt having a layered structure of polyimide and fluororesin is prepared in accordance with the method described in Example 16, except that the polyamic acid solution as prepared above is used, and a running test is conducted in accordance with the method described in Example 16. As a result, breakage at belt edges is observed after the running of 40,000 sheets. At this time, wrinkles are formed in the printed material and printing irregularities are observed.

Comparative Example 18

54.049 g (0.4998 mol) of PDA and 600 g of NMP are mixed and placed in a 1 L separable flask, and the mixture is heated to 70° C. and stirred. 145.951 g (0.4961 mol) of BPDA and 0.5550 g (0.0037 mol) of PA are added to 200 g of NMP to form a slurry, and this slurry is gradually dropped in the flask over 30 minutes. Then, the content of the flask is allowed to polymerize for 24 hours while maintaining the temperature at 70° C. and stirring. Thereafter, the reaction solution is filtered with a stainless mesh (#800) to obtain a polyamic acid solution. In this process, the value of Y/X=BPDA (mol)/PDA (mol) is 0.9925, and Z/2(X−Y)=PA (mol)/2{PDA (mol)−BPDA (mol)} is 0.50. The imidization degree as measured in accordance with the method as described above is 12.0.

An endless belt having a layered structure of polyimide and fluororesin is prepared in accordance with the method described in Example 16, except that the polyamic acid solution as prepared above is used, and a running test is conducted in accordance with the method described in Example 16. As a result, breakage at belt edges is observed after the running of 130,000 sheets. At this time, wrinkles are formed in the printed material and printing irregularities are observed.

Example 17

<Separation of Polyimide and Fluororesin>
A strip of 20 mm×40 mm is cut from the endless belt produced in the method of Example 16. Further, the polyimide layer and the fluororesin layer at a portion of 10 mm from the edges of the strip are separated from each other using a cutter, and a sample is thus obtained.

Then, the polyimide layer and the fluororesin layer are separated from each other by nipping these layers at the edge portions of the sample by a chuck and pulling them upwards and downwards, respectively, using a tensile tester (product number: 1605N, manufactured by Aikoh Engineering Co., Ltd.) at conditions of a chuck distance of 10 min and a tensile rate of 5 mm/min. The maximum load at this time is 6.91 N.

Comparative Example 19

Separation of the polyimide layer and the fluororesin layer of the endless belt produced in Comparative Example 17 are performed in accordance with the method described in Example 17. The maximum load at this time is 5.95 N.

Comparative Example 20

Separation of the polyimide layer and the fluororesin layer of the endless belt produced in Comparative Example 18 are performed in accordance with the method described in Example 17. The maximum load at this time is 6.18 N.

All publications, patent applications, and technical standards mentioned in this specification are herein incorporated by reference to the same extent as if each individual publication, patent application, or technical standard was specifically and individually indicated to be incorporated by reference.

TABLE 1

| | | EXAMPLES | | | | | | | |
|---|---|---|---|---|---|---|---|---|---|
| | | 1 | 2 | 3 | 4 | 5 | 6 | 7 | 8 |
| (I) Diamine compound | Type | PDA | PDA | PDA | PDA | PDA | PDA | PDA | PDA |
| | X (mol) | 0.506 | 0.506 | 0.506 | 0.506 | 0.501 | 0.501 | 0.501 | 0.501 |
| (II) Tetracarboxylic dianhydride | Type | BPDA | BPDA | BPDA | BPDA | BPDA | BPDA | BPDA | BPDA |
| | Y (mol) | 0.494 | 0.494 | 0.494 | 0.494 | 0.496 | 0.496 | 0.496 | 0.496 |
| (III) Acid monoanhydride | Type | PA | PA | PA | PA | PA | PA | PA | PA |
| | Z (mol) | 0.001 | 0.004 | 0.006 | 0.011 | 0.001 | 0.002 | 0.003 | 0.003 |
| Y/X | | 0.976 | 0.976 | 0.976 | 0.976 | 0.99 | 0.99 | 0.99 | 0.99 |
| Z/2(X − Y) | | 0.04 | 0.17 | 0.25 | 0.46 | 0.10 | 0.20 | 0.30 | 0.30 |
| Reaction temperature | ° C. | 70 | 70 | 70 | 70 | 70 | 70 | 70 | 60 |
| Reaction time | h | 24 | 24 | 24 | 24 | 24 | 24 | 24 | 24 |
| Viscosity | Pa · s | 21 | 20 | 19 | 19 | 95 | 93 | 90 | 92 |
| Imidization degree | % | 10.3 | 10.3 | 10.3 | 10.3 | 11 | 11 | 11 | 6.4 |
| Viscosity change ratio | % | 116 | 117 | 110 | 106 | 119 | 105 | 108 | 113 |
| Tensile strength | Mpa | 379 | 378 | 378 | 370 | 460 | 462 | 465 | 390 |
| Tensile elongation | % | 28 | 28 | 29 | 27 | 46 | 46 | 45 | 42 |
| MIT folding endurance test | x 1000 times | 6 | 6 | 6 | 6 | 10 | 12 | 11 | 8 |

TABLE 2

| | | EXAMPLES | | | | | | |
|---|---|---|---|---|---|---|---|---|
| | | 9 | 10 | 11 | 12 | 13 | 14 | 15 |
| (I) Diamine compound | Type | PDA | PDA | PDA | PDA | PDA | PDA | PDA |
| | X (mol) | 0.501 | 0.501 | 0.501 | 0.499 | 0.499 | 0.499 | 0.499 |
| (II) Tetracarboxylic dianhydride | Type | BPDA | BPDA | BPDA | BPDA | BPDA | BPDA | BPDA |
| | Y (mol) | 0.496 | 0.496 | 0.496 | 0.497 | 0.497 | 0.497 | 0.497 |
| (III) Acid monoanhydride | Type | PA | PA | PA | PA | PA | PA | PA |
| | Z (mol) | 0.003 | 0.003 | 0.004 | 0.001 | 0.001 | 0.001 | 0.0015 |
| Y/X | | 0.99 | 0.99 | 0.99 | 0.996 | 0.996 | 0.996 | 0.996 |
| Z/2(X − Y) | | 0.30 | 0.30 | 0.40 | 0.25 | 0.25 | 0.25 | 0.38 |
| Reaction temperature | ° C. | 70 | 70 | 70 | 70 | 60 | 60 | 60 |
| Reaction time | h | 36 | 48 | 24 | 24 | 24 | 36 | 36 |
| Viscosity | Pa · s | 85 | 72 | 85 | 167 | 170 | 170 | 168 |

TABLE 2-continued

|  |  | EXAMPLES | | | | | | |
|---|---|---|---|---|---|---|---|---|
|  |  | 9 | 10 | 11 | 12 | 13 | 14 | 15 |
| Imidization degree | % | 15.1 | 20 | 11 | 12.2 | 6.8 | 8.1 | 8.1 |
| Viscosity change ratio | % | 107 | 105 | 103 | 106 | 105 | 106 | 104 |
| Tensile strength | Mpa | 468 | 483 | 463 | 470 | 468 | 465 | 466 |
| Tensile elongation | % | 46 | 48 | 43 | 49 | 45 | 46 | 46 |
| MIT folding endurance test | x 1000 times | 12 | 8 | 9 | 12 | 10 | 11 | 10 |

TABLE 3

|  |  | COMPARATIVE EXAMPLES | | | | | | | |
|---|---|---|---|---|---|---|---|---|---|
|  |  | 1 | 2 | 3 | 4 | 5 | 6 | 7 | 8 |
| (I) Diamine compound | Type | PDA | PDA | PDA | PDA | PDA | PDA | PDA | PDA |
|  | X (mol) | 0.508 | 0.506 | 0.506 | 0.506 | 0.502 | 0.502 | 0.502 | 0.501 |
| (II) Tetracarboxylic dianhydride | Type | BPDA | BPDA | BPDA | BPDA | BPDA | BPDA | BPDA | BPDA |
|  | Y (mol) | 0.493 | 0.494 | 0.494 | 0.494 | 0.495 | 0.495 | 0.496 | 0.496 |
| (III) Acid monoanhydride | Type | PA | PA | PA | PA | PA | PA | PA | PA |
|  | Z (mol) | 0.0075 | 0 | 0.012 | 0.024 | 0 | 0.007 | 0.014 | 0 |
| Y/X |  | 0.970 | 0.976 | 0.976 | 0.976 | 0.986 | 0.986 | 0.986 | 0.990 |
| Z/2(X − Y) |  | 0.25 | 0.00 | 0.50 | 1.00 | 0.00 | 0.50 | 1.00 | 0.00 |
| Reaction temperature | °C. | 70 | 70 | 70 | 70 | 70 | 70 | 70 | 70 |
| Reaction time | h | 24 | 24 | 24 | 24 | 24 | 24 | 24 | 24 |
| Viscosity | Pa·s | 13 | 22 | 19 | 18 | 81 | 73 | 63 | 98 |
| Imidization degree | % | 10.3 | 10.3 | 10.3 | 10.3 | 10.7 | 10.7 | 10.9 | 11.6 |
| Viscosity change ratio | % | 106 | 139 | 116 | 102 | 124 | 115 | 103 | 128 |
| Tensile strength | Mpa | 330 | 378 | 375 | 377 | 458 | 450 | 452 | 465 |
| Tensile elongation | % | 18 | 28 | 27 | 24 | 45 | 43 | 43 | 44 |
| MIT folding endurance test | x 1000 times | 6 | 6 | 4 | 3 | 9 | 5 | 4 | 7 |

TABLE 4

|  |  | COMPARATIVE EXAMPLES | | | | | | | |
|---|---|---|---|---|---|---|---|---|---|
|  |  | 9 | 10 | 11 | 12 | 13 | 14 | 15 | 16 |
| (I) Diamine compound | Type | PDA | PDA | PDA | PDA | PDA | PDA | PDA | PDA |
|  | X (mol) | 0.501 | 0.501 | 0.498 | 0.501 | 0.501 | 0.501 | 0.508 | 0.508 |
| (II) Tetracarboxylic dianhydride | Type | BPDA | BPDA | BPDA | BPDA | BPDA | BPDA | BPDA | BPDA |
|  | Y (mol) | 0.496 | 0.496 | 0.497 | 0.496 | 0.496 | 0.496 | 0.493 | 0.493 |
| (III) Acid monoanhydride | Type | PA | PA | PA | PA | PA | PA | PA | PA |
|  | Z (mol) | 0.005 | 0.010 | 0.0005 | 0.0025 | 0.0025 | 0.005 | 0.0075 | 0.015 |
| Y/X |  | 0.990 | 0.990 | 0.998 | 0.990 | 0.990 | 0.990 | 0.970 | 0.970 |
| Z/2(X − Y) |  | 0.50 | 1.00 | 0.25 | 0.25 | 0.25 | 0.50 | 0.25 | 0.50 |
| Reaction temperature | °C. | 70 | 70 | 70 | 40 | 90 | 40 | 40 | 70 |
| Reaction time | h | 24 | 24 | 24 | 24 | 24 | 24 | 24 | 24 |
| Viscosity | Pa·s | 83 | 75 | — | 90 | 15 | 90 | 13 | 15 |
| Imidization degree | % | 11.6 | 11.7 | 12.3 | 4.5 | 35.2 | 4.5 | 4.3 | 12.2 |
| Viscosity change ratio | % | 118 | 105 | *1 | 105 | *2 | 118 | 106 | 105 |
| Tensile strength | Mpa | 460 | 450 |  | 441 |  | 433 | 311 | 310 |
| Tensile elongation | % | 45 | 44 |  | 41 |  | 40 | 17 | 17 |
| MIT folding endurance test | x 1000 times | 5 | 4 |  | 6 |  | 5 | 5 | 5 |

*1: Viscosity is too high for application.
*2: Gelled impurities occur and a uniform film cannot be formed.

What is claimed is:

1. A polyamic acid composition comprising a polyamic acid, the polyamic acid having an imidization ratio of from about 5.0% to about 25.0%, and being obtained by reacting a diamine compound, a tetracarboxylic dianhydride and an acid monoanhydride at an amount ratio that satisfies the following Formula (1) and Formula (2):

$$0.970 < Y/X < 0.998 \quad \text{Formula (1)}$$

$$0.00 < Z/2(X-Y) < 0.50 \quad \text{Formula (2)}$$

wherein in Formula (1) and Formula (2), X represents the content (mol) of the diamine compound, Y represents the content (mol) of the tetracarboxylic dianhydride, and Z represents the content of the acid monoanhydride (mol).

2. The polyamic acid composition according to claim 1, wherein the diamine compound comprises at least one selected from the group consisting of p-phenylenediamine and 4,4'-diaminodiphenyl ether.

3. The polyamic acid composition according to claim 1, wherein the tetracarboxylic dianhydride comprises at least one selected from the group consisting of pyromellitic dianhydride and 3,3',4,4'-biphenyl tetracarboxylic dianhydride.

4. The polyamic acid composition according to claim 1, wherein the acid monoanhydride comprises at least one selected from the group consisting of maleic anhydride and phthalic anhydride.

* * * * *